(12) United States Patent
Shiroto

(10) Patent No.: US 10,725,547 B2
(45) Date of Patent: Jul. 28, 2020

(54) INPUT DEVICE

(71) Applicant: DENSO TEN Limited, Kobe-shi, Hyogo (JP)

(72) Inventor: Hironori Shiroto, Kobe (JP)

(73) Assignee: DENSO TEN LIMITED, Kobe (JP)

( * ) Notice: Subject to any disclaimer, the term of this patent is extended or adjusted under 35 U.S.C. 154(b) by 0 days.

(21) Appl. No.: 15/923,077

(22) Filed: Mar. 16, 2018

(65) Prior Publication Data

US 2018/0348872 A1 Dec. 6, 2018

(30) Foreign Application Priority Data

May 31, 2017 (JP) .................................. 2017-107871

(51) Int. Cl.
*G06F 3/01* (2006.01)
*G06F 3/044* (2006.01)

(52) U.S. Cl.
CPC .............. *G06F 3/016* (2013.01); *G06F 3/044* (2013.01)

(58) Field of Classification Search
CPC ................................. G06F 3/016; G06F 3/044
See application file for complete search history.

(56) References Cited

U.S. PATENT DOCUMENTS

| 2013/0271412 | A1* | 10/2013 | Adachi | G06F 3/016 345/173 |
| 2015/0160771 | A1* | 6/2015 | Takeuchi | G06F 3/0414 345/177 |
| 2016/0004312 | A1* | 1/2016 | Kono | G06F 1/1626 340/407.1 |
| 2018/0284893 | A1* | 10/2018 | Shimizu | G06F 3/0414 |

FOREIGN PATENT DOCUMENTS

| JP | 2004-334740 A | 11/2004 |
| JP | 2014-085932 A | 5/2014 |
| JP | 2015-114816 A | 6/2015 |
| JP | 2016-086358 A | 5/2016 |
| WO | 2012/111349 A1 | 8/2012 |
| WO | 2013/057940 A1 | 4/2013 |

* cited by examiner

*Primary Examiner* — Kent W Chang
*Assistant Examiner* — Andrew Lee
(74) *Attorney, Agent, or Firm* — Oliff PLC

(57) ABSTRACT

An input device includes an operation panel, a vibrator, a support panel, and an intermediate member. The operation panel has an operation surface and a back surface facing in a direction opposite to a direction in which the operation surface faces. The vibrator is mounted on the operation panel and vibrates the operation panel. The support panel is disposed to face the back surface of the operation panel and supports the operation panel, a space provided between the support panel and the back surface of the operation panel. The intermediate member is disposed between the operation panel and the support panel and is mounted to a first one of the back surface of the operation panel and the support panel.

17 Claims, 5 Drawing Sheets

INPUT DEVICE

BACKGROUND OF THE INVENTION

Field of the Invention

The present invention relates to an input device and an input system.

Description of the Background Art

In the related, an input device that allows a user to recognize acceptance of an input operation by giving a sense of touch to the user has been known. In the input device, for example, vibration is generated in response to a pressure force by the user acting on an operation surface, which allows the user to recognize acceptance of the input operation.

Here, the input device includes an operation panel having an operation surface and a support panel supporting the operation panel. The support panel is disposed to face the back surface of the operation panel through a space. Therefore, for example, when the user presses the operation surface strongly, the operation panel may be bent and brought into contact with the support panel in some cases. When the operation panel is brought into contact with the support panel, there is a possibility that the vibration characteristics in the operation panel deteriorate extremely, such as a sharp weakening of vibration generated on the operation panel.

SUMMARY OF THE INVENTION

According to one aspect of the present invention, there is provided an input device including an operation panel that has an operation surface and a back surface facing in a direction opposite to a direction in which the operation surface faces, a vibrator that is mounted on the operation panel and vibrates the operation panel, a support panel that is disposed to face the back surface of the operation panel and supports the operation panel, a space provided between the support panel and the back surface of the operation panel, and an intermediate member that is disposed between the operation panel and the support panel and is mounted to a first one of the back surface of the operation panel and the support panel.

Deterioration of the vibration characteristics in the operation panel can be suppressed.

According to another aspect of the present invention, the operation panel is a rectangular plate, and the intermediate member is provided at a position corresponding to a short side of the operation panel.

Deterioration of the vibration characteristics in the operation panel can be effectively suppressed.

Therefore, an object of the present invention is to provide an input device and an input system capable of suppressing deterioration of vibration characteristics in an operation panel.

These and other objects, features, aspects and advantages of the present invention will become more apparent from the following detailed description of the present invention when taken in conjunction with the accompanying drawings.

DESCRIPTION OF THE EMBODIMENTS

Hereinafter, embodiments of an input device and an input system disclosed in the present invention will be described in detail with reference to accompanying drawings. The present invention is not limited to the embodiments described below.

1. Outline of Input Device

Figure 1A:
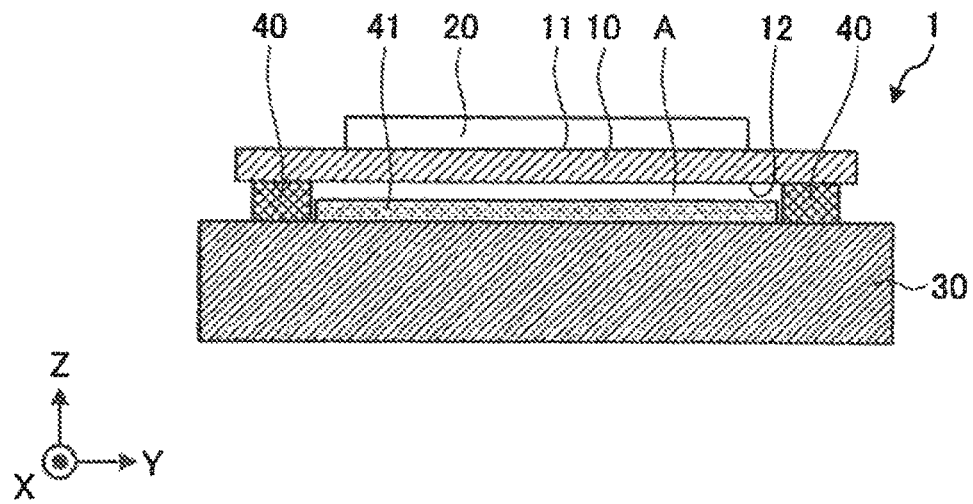
FIG. 1A is a side cross sectional view of an input device according to an embodiment.

In the following, first, an outline of an input device according to an embodiment will be described using FIG. 1A and the like. FIG. 1A is a side cross sectional view of an input device according to an embodiment.

Figure 1B:
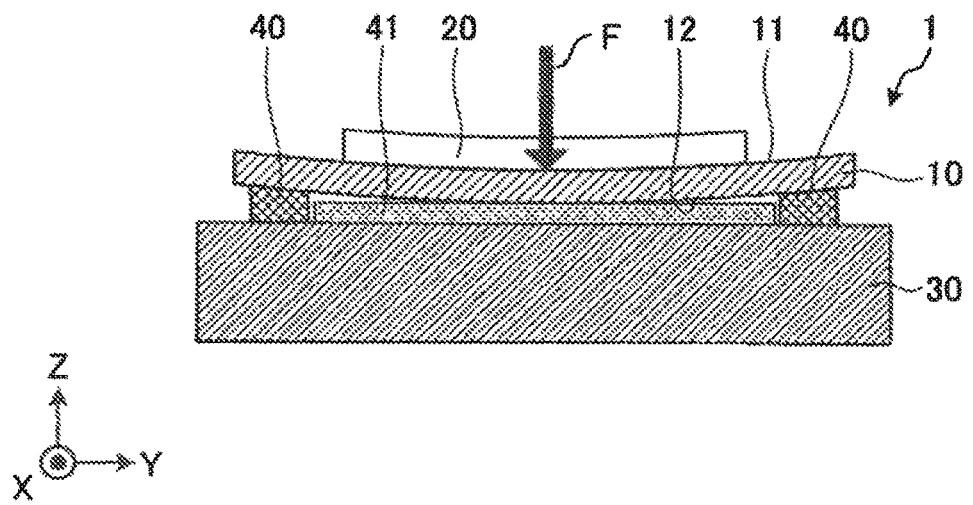
FIG. 1B is the side cross sectional view of the input device according to the embodiment.
Figure 4:
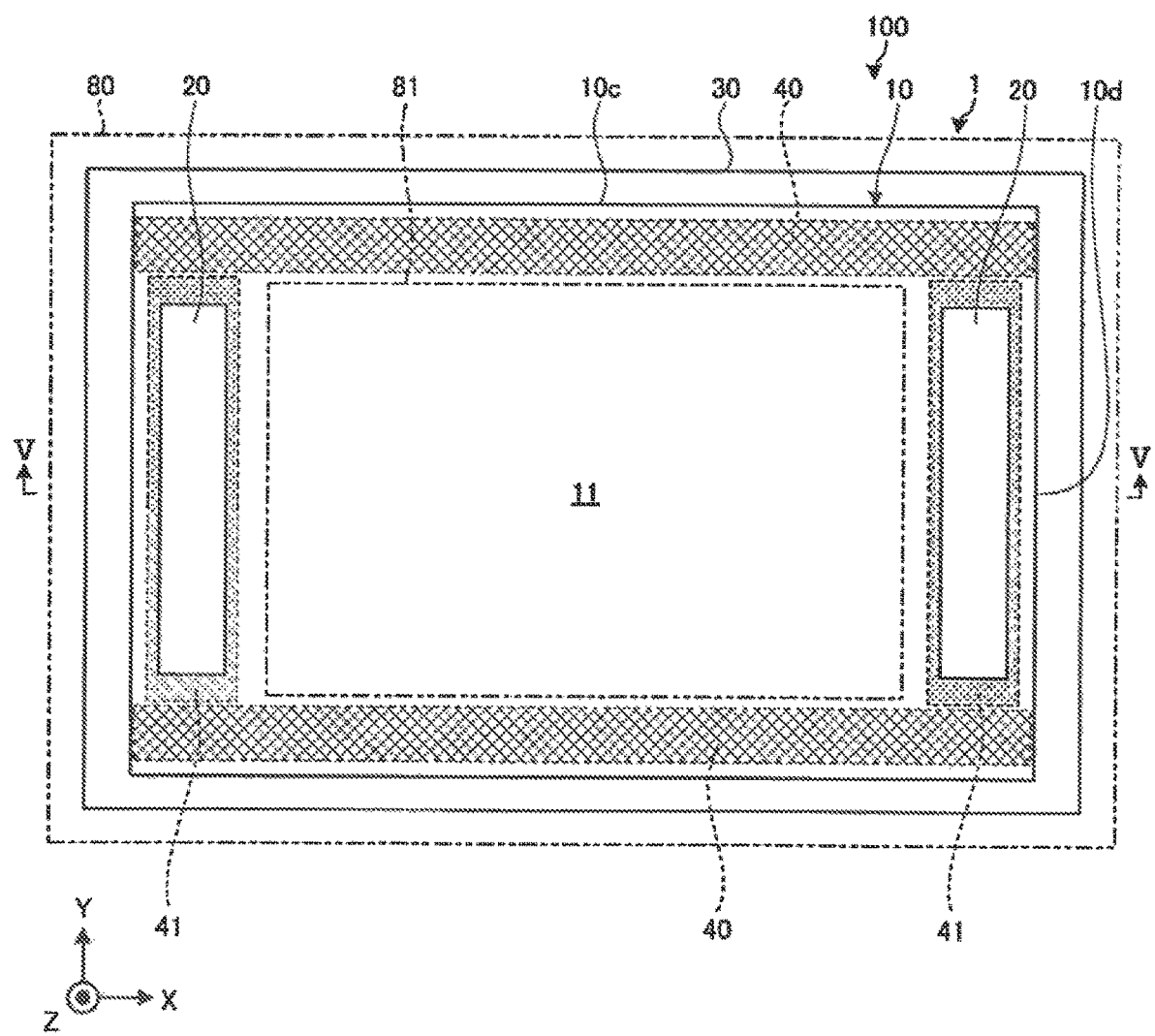
FIG. 4 is a plan view of an input system according to the embodiment.

FIG. 1A and FIG. 1B, and the FIG. 4 and the subsequent figures are schematic views. Therefore, the size, shape, and the like of each constituent element shown in FIG. 1A and the like are not necessarily accurate. In each figure, in some cases each constituent element is shown in exaggeration for convenience of understanding. In FIG. 1A, a three-dimensional orthogonal coordinate including an X axis, a Y axis and a Z axis is shown. The three-dimensional orthogonal coordinate system may be represented in other figures.

As shown in FIG. 1A, the input device 1 includes an operation panel 10, vibrators 20, a support panel 30, and an adhesive portion 40. The input device 1 can be used, for example, as a touch panel having a vibration function in which the operation surface 11 of the operation panel 10 is vibrated by being controlled by a controller (not shown). Further, as described below, the input device 1 and the controller can be used as the touch panel having a vibration function in combination with a display such as a liquid crystal display.

The operation panel 10 is a flat plate member, and has an operation surface 11 substantially at the center. The operation panel 10 has a function of detecting a contact position of a user with the operation surface 11. For example, the operation panel 10 includes a capacitive type contact sensor (not shown), and the contact position of the user with the operation surface 11 can be detected by the contact sensor. When the operation panel 10 does not have the function of detecting the contact position, the support panel 30 may have the function of detecting the contact position, or a configuration having the function of detecting the contact position may be separately disposed. The contact of the user with the operation surface 11 is performed, for example, by the user bring a finger or the like into contact with the operation surface 11, or bring a touch pen or the like into contact with the operation surface 11.

The vibrators 20 are vibration elements, for example, piezoelectric elements (piezo elements) or the like. A plurality of vibrators 20 is present (in this case, two). One is not visible in FIG. 1A. In the example shown in FIG. 1A, the number of the vibrators 20 are two, but the number is not limited thereto and may be one or three or more.

The vibrators 20 are fixedly mounted on the operation surface 11 of the operation panel 10 with an adhesive or the like. Then, the vibrators 20 vibrate the operation panel 10. For example, the vibrators 20 are controlled by the controller, and can vibrate the operation panel 10 in a plurality of modes in which vibration frequencies are different.

Specifically, the vibrators 20 vibrate the operation panel 10 at a high frequency in an ultrasonic band in a state where the user's finger is in contact with the operation surface 11, or vibrates the operation panel 10 at a frequency lower than the ultrasonic band. In this way, a slippery feel and a tremblingly vibratory feel can be given to the user's finger on the operation surface 11, which will be described later with reference to FIG. 3.

The support panel 30 supports the operation panel 10. Specifically, the support panel 30 is a flat plate member. The support panel 30 is disposed to face the back surface 12 of the operation panel 10 opposite to the operation surface 11 through a space A and supports the operation panel 10.

The adhesive portion 40 allows the operation panel 10 and the support panel 30 to adhere to each other. The operation panel 10 partially adheres to the support panel 30, for example, at the long side, as will be described later with reference to FIG. 4.

Here, in the input device 1 according to the present embodiment, the space A is formed between the operation panel 10 and the support panel 30 by the thickness of the adhesive portion 40 in the Z axis direction. To this end, in the related art, for example, when the operation surface is strongly pressed by a user in the negative direction of the Z axis, the operation panel may be bent and is brought into contact with the support panel in some cases. In this case, there is a possibility that the vibration characteristics in the operation panel deteriorate extremely, such as a sharp weakening of vibration generated on the operation panel.

Therefore, the input device 1 according to the present embodiment is provided with the intermediate member 41. In this way, in the present embodiment, it is possible to suppress the deterioration of vibration characteristics in the operation panel 10. That is, the intermediate member 41 is disposed between the operation panel 10 and the support panel 30. Further, the intermediate member 41 is positioned such that the intermediate member 41 comes into contact with the support panel 30 and does not come into contact with the operation panel 10.

As the intermediate member 41, a member having a relatively low hardness, for example, urethane foam can be used, but it is not limited thereto. That is, the intermediate member 41 may be a soft member having a lower hardness than that of the support panel 30, and may be other kinds of members, such as rubber, for example.

FIG. 1B is the side cross sectional view showing the input device 1 according to the embodiment. As indicated by an arrow F in FIG. 1B, when the operation surface 11 is strongly pressed by the user, the operation panel 10 is curvedly bent to protrude in the negative direction of the Z axis. As described above, even when the operation panel 10 is bent, since the intermediate member 41 is provided in the present embodiment the operation panel 10 is brought into contact with the intermediate member 41 before reaching the support panel 30.

As a result, for example, the vibration generated on the operation panel 10 is less likely to be weakened as compared with the case where the operation panel 10 comes into contact with the support panel 30, which makes it possible to suppress deterioration of vibration characteristics in the operation panel 10.

Further, since the intermediate member 41 is positioned so as not to come into contact with the operation panel 10, in a state where the operation panel 10 is not bent (for example, an initial state), the vibration generated on the operation panel 10 cannot be affected.

For example, if the intermediate member 41 is the member having a relatively high hardness, when the operation panel 10 comes into contact with the intermediate member 41, an abnormal noise may occur. However, in the present embodiment, since the member having a relatively low hardness is used as the intermediate member 41, occurrence of the noise can be suppressed.

2. Example of Mounting of Electronic Device System

Figure 2:
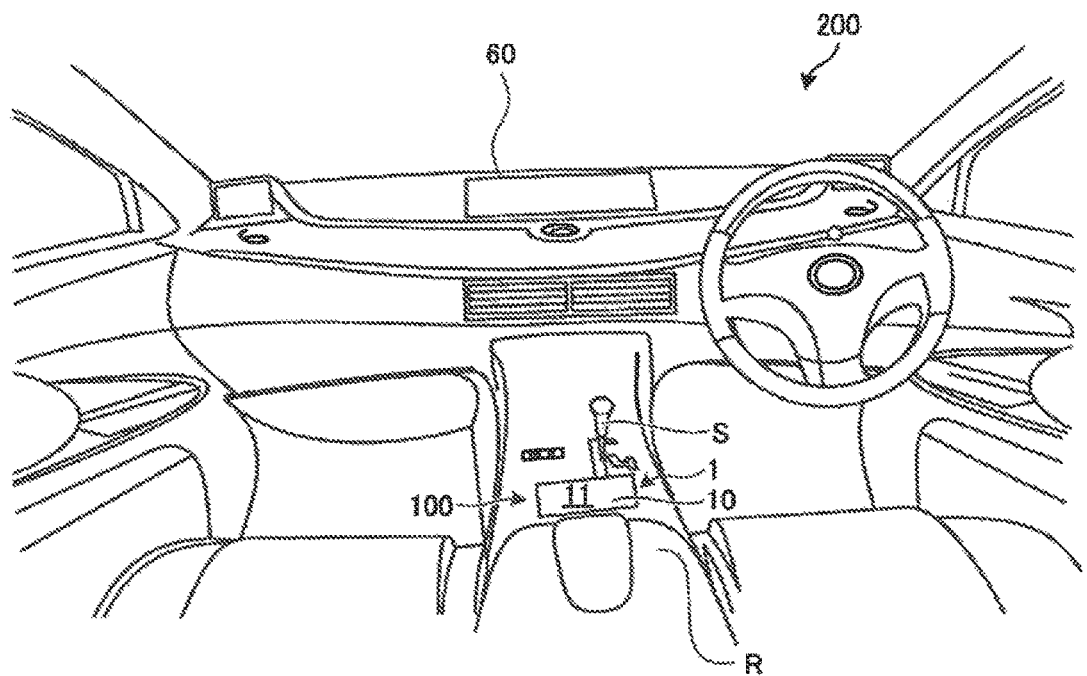
FIG. 2 is a view showing an example of mounting of an electronic device system according to the embodiment.

FIG. 2 is a view showing a view showing an example of mounting of an electronic device system 200 including an input system 100 provided with the input device 1 according to the embodiment. As shown in FIG. 2, the electronic device system 200 according to the present embodiment is mounted on a vehicle as one example.

The electronic device system 200 includes the input system 100 and a display device 60. The input system 100 is connected in-vehicle devices, such as the display device 60 or a speaker, for example, through network communication, and functions as an input device of the in-vehicle devices. In addition, the input system 100 includes the input device 1, and the input device 1 can be used as the touch pad as described above.

The operation surface 11 of the operation panel 10 is disposed at a position where a driver can operate it easily, for example, in the vicinity of a shift lever S of a center console. In the example of FIG. 2, the operation surface 11 is disposed between an am lever R and the shill lever S. Therefore, the user can operate the operation surface 11 with the arm of the user placed on the arm lever R. In this way, the user can easily operate the input system 100 without rearranging the user's driving posture.

Examples of the in-vehicle device in-vehicle device include various devices, such as the display device 60 for displaying a predetermined image, a speaker for outputting predetermined sound, an air conditioner, a car navigation system and the like. Therefore, the user can operate such various devices by operating the input system 100.

When an input operation from the user is accepted, the above-described input system 100 generates high frequency vibration and low frequency vibration on the operation paned 10 in accordance with the input operation, thereby allowing the user to recognize the acceptance of the input operation.

3. Details of Electronic Device System

Figure 3:
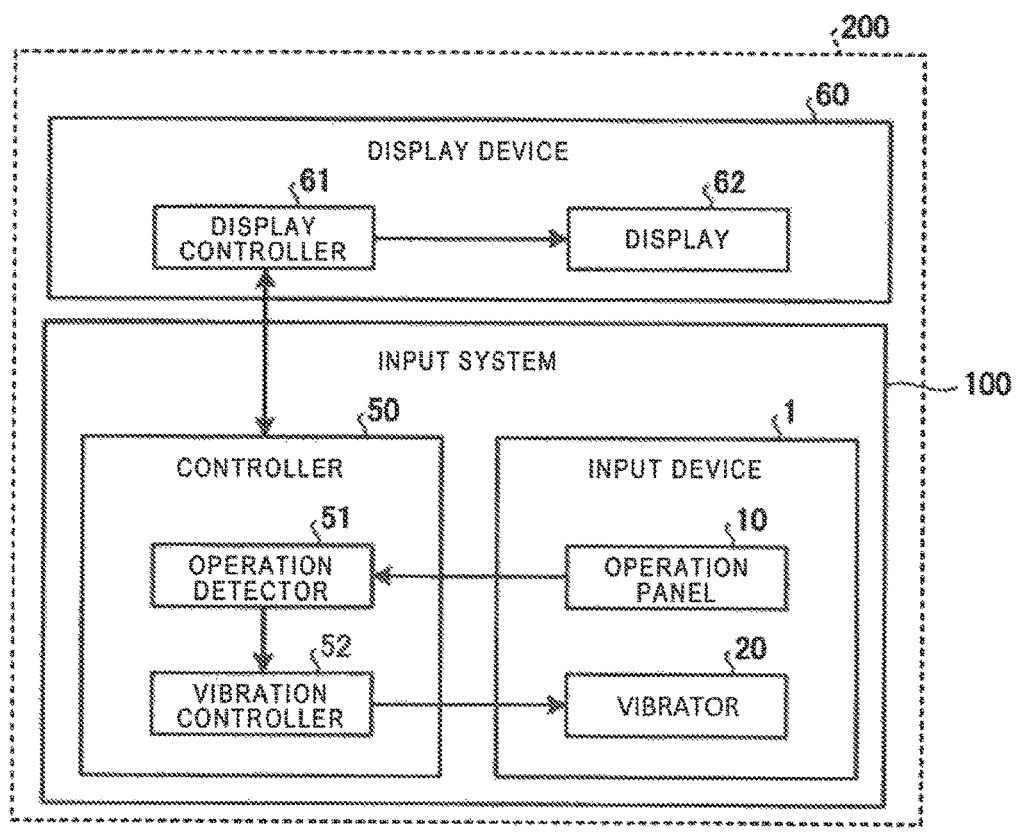
FIG. 3 is a view showing an example of a configuration of the electronic device system according to the embodiment.

Next, the electronic device system 200 according to the embodiment will be described using FIG. 3. FIG. 3 is a view showing an example of a configuration of the electronic device system 200 according to the embodiment. In FIG. 3, only constituent elements necessary for describing the features of the present embodiment is shown as functional blocks, and descriptions of general constituent elements will be omitted.

In other words, each constituent element shown in FIG. 3 is functionally conceptual, and does not necessarily need to be physically configured as shown. For example, specific forms of distribution and integration of each functional block are not limited to the forms shown in the drawings, and can be configured by physically or functionally distributing and integrating all or apart of the forms in arbitrary units according to various loads and usage situations.

As shown in FIG. 3, the electronic device system 200 includes the input system 100 and the display device 60. The input system 100 includes the input device 1 and the controller 50. The input device 1 accepts the input operation from the user. The input device 1 includes the operation panel 10 and the vibrator 20 described above. When an input performed by the user is accepted through the operation surface 11, the operation panel 10 detects a contact position of the user with the operation surface 11 and outputs a signal including information corresponding to the detected contact position (for example, coordinate information) to the controller 50.

The controller 50 controls the vibrator 20 according to the detected contact position by the operation panel 10 of the input device 1. The controller 50 is a microprocessor including a central processing unit (CPU), a storage, and the like.

The controller 50 includes an operation detector 51 and a vibration controller 52. The operation detector 51 detects the input operation which the user performs on the operation surface 11 based on the information of the contact position output firm the operation panel 10.

For example, when the electronic device system 200 is used as a car navigation system, if the information of the contact position output from the operation panel 10 is the position corresponding to a destination setting button on the operation surface 11, the operation detector 51 detects that an input operation by the user is an input operation to set the destination.

When the input operation performed by the user on the operation surface 11 is detected, the operation detector 51 outputs a signal indicating the detected input operation to the vibration controller 52 and the display device 60.

The vibration controller 52 outputs a voltage signal to the vibrator 20 based on a signal output from the operation detector 51, that is the signal indicating the input operation of the user to control the vibrator 20. That is, the vibration controller 52 controls the vibrator 20 based on the input operation on the operation surface 11.

Specifically, the vibration controller 52 can control the vibrator 20 so as to vibrate the operation panel 10 in a plurality of modes in which the vibration frequencies are different, based on the input operation on the operation surface 11. More specifically, the vibration controller 52 can control the vibrator 20 so as to switch between the mode in which the vibration of the frequency in the ultrasonic band is generated on the operation panel 10 and the mode in which the vibration in the frequency band lower than the ultrasonic band is generated on the operation panel 10 based on the input operation on the operation surface 11.

The frequency in the ultrasonic band described above (high frequency) is, for example, 20 to 40 kHz, and the frequency lower than the ultrasonic band (low frequency) is, for example, 200 Hz or less, but the frequencies are not limited thereto. The mode in which vibration is generated at the high frequency in the ultrasonic band is one example of a first vibration mode. The mode in which vibration is generated at the low frequency is one example of a second vibration mode.

When the vibration controller 52 controls the vibrators 20 to vibrate the operation panel 10 at the high frequency in the ultrasonic band, the standing wave W (see FIG. 5) is generated on the operation panel 10, thereby making it possible to reduce the frictional forte of the operation surface 11 with respect to the user using the squeeze effect.

The squeeze effect refers to a phenomenon that, when the standing wave W is generated by vibrating the operation surface 11 at a high frequency by the vibrator 20, an air layer is formed between the user's finger and the operation surface 11 due to pressure fluctuation by vibration, and thus the frictional resistance between the user's finger and the operation surface 11 becomes relatively low compared to when there is no vibration.

From the fact that the frictional force on the operation surface 11 of the operation panel 10 is reduced, for example, it is possible to give the user a smooth tactile sensation as if the user is sucked in the sliding direction of the sliding operation of the user moving the finger on the operation surface 11 of the operation panel 10.

Further, w en the vibration controller 52 controls the vibrator 20 to vibrate the operation panel 10 at a low frequency in a state in which the user's finger is in contact with the operation surface 11, it is possible to give the user a trembling tactile sensation by transferring the vibration of the vibrator 20 to the user's finger through the operation panel 10.

The display device 60 includes a display controller 61 and a display 62. The display controller 61 displays a predetermined image on the display 62 in response to a signal output from the operation detector 51 and indicating the input operation of the user on the operation surface 11. The display 62 can use, for example, a liquid crystal display, but is not limited thereto and may use other types of displays such as an organic EL display or the like.

4. Specific Configuration of Input System

Figure 5:
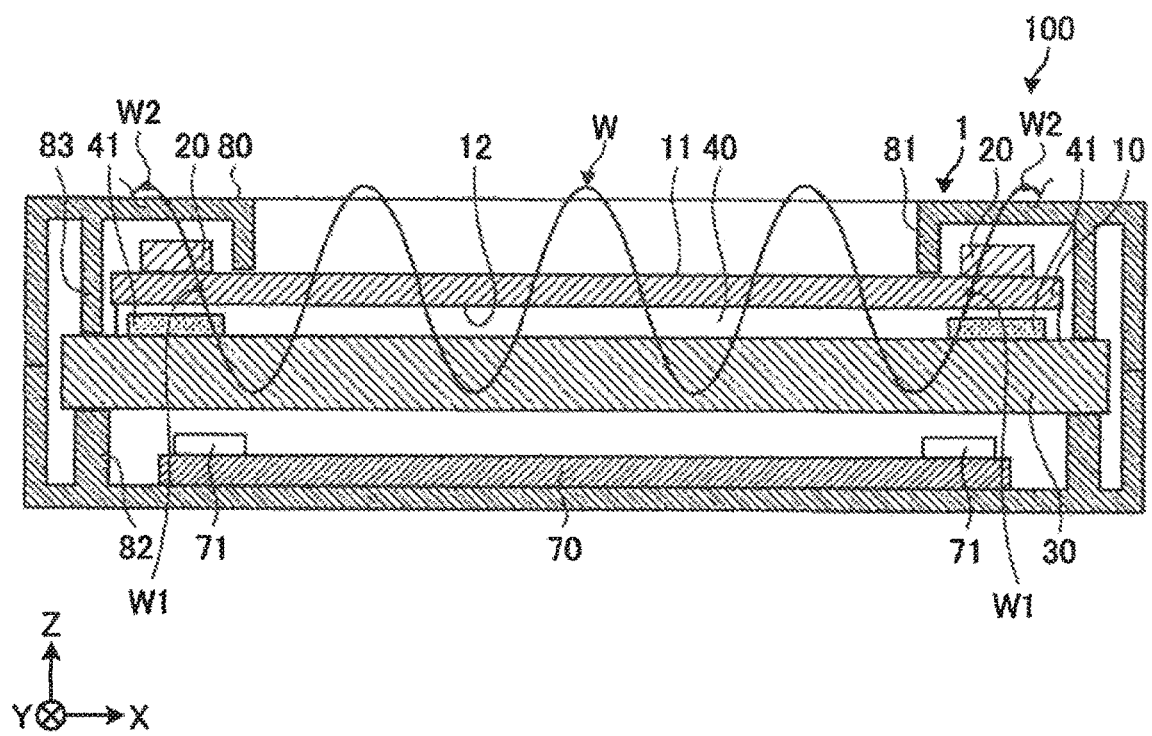
FIG. 5 is a cross sectional view taken along line V-V of FIG. 4.

Next, the input system 100 including the input device 1 will be described in detail with reference to FIG. 4 and FIG. 5. FIG. 4 is a plan view of the input system 100 according to the embodiment, and FIG. 5 is a cross sectional view taken along line V-V of FIG. 4.

The input system 100 includes the input device 1 described above, a control board 70 on which the controller 50 is mounted (see FIG. 5), and ad a housing 80. On the control board 70, connection terminals 71 (see FIG. 5) for the controller 50 are mounted in addition to the controller 50 and the like described above. The connection terminals 71 are electrically connected to the vibrators 20 through wirings (not shown).

The housing 80 is formed, for example in a substantially rectangular parallelepiped shape, and accommodates the input device 1, the control board 70, and the like. In FIG. 4, in order to better show the input device 1 and the like accommodated in the housing 80, the housing 80 is drawn by imaginary lines.

An opening 81 having a substantially rectangular shape in a plan view is formed in the housing 80. The operation panel 10 is disposed close to the opening 81 of the housing 80, and a portion of the operation panel 10 that is exposed through the opening 81 is the operation surface 11.

As shown in FIG. 5, the housing 80 includes a placing portion 82 and a pressing portion 83. The placing portion 82 protrudes upward from the bottom surface of the housing 80 to place the support panel 30. The pressing portion 83 protrudes downward from the top surface of the housing 80. Then, the pressing portion 83 presses the support panel 30 toward the placing portion 82. In this way, the input device 1 including the support panel 30 is stably held in the housing 80. The positions and shapes of the placing portion 82 and the pressing portion 83 shown in FIG. 5 are merely examples, and are not limited.

As shown in FIG. 4, the operation panel 10 of the input device 1 is a quadrilateral plate, specifically, a rectangular plate having a long side 10c and short side 10d. In addition, the support panel 30 is also a rectangular plate, like the operation panel 10. The support panel 30 has a long side and a short side, both of which are longer than the long side 10c and the short side 10d of the operation panel 10, respectively, in a plan view, that is, the support panel 30 is formed to have a larger area than that of the operation panel 10 in a plan view. The support panel 30 is formed to have a thickness greater than that of the operation panel 10, but it is not limited thereto.

The operation panel 10 and the support panel 30 are all made of glass having relatively high hardness. In this way, the operation panel 10 and the support panel 30 can have enhanced durability against external impact or heat, for example. The operation panel 10 and the support panel 30 are not limited to glass, and may be made of other kinds of materials such as a resin, or the like.

The vibrators 20 are each mounted, for example, in the vicinity of the short side 10d of the operation panel 10, but it is not limited thereto. In other words, the vibrators 20 are each mounted on the end portion in the long side direction (X axis direction) of the operation panel 10, but it is not limited thereto. For example, the vibrators 20 are mounted on the end portion in the short side direction (Y axis direction) of the operation panel 10. The vibrators 20 are mounted, for example, facing with each other in the region outside the operation surface 11.

As shown in FIG. 4, the adhesive portion 40 is positioned, for example, on the region outside of the operation surface 11. In FIG. 4, the adhesive portions 40 are indicated by hatching and the intermediate members 41 are indicated by dots so as to clearly show the positions where the adhesive portions 40 and the intermediate members 41 are provided.

The adhesive portion 40 is provided at a position where the long side 10c of the operation panel 10 and the support panel 30 adhere to each other. In this way, it is possible to effectively generate high frequency vibration and low frequency vibration on the operation panel 10.

That is, when the operation panel 10 is bent due to vibration of the operation panel 10, generation of high frequency vibration, or the like on the operation panel 10 is hindered. Therefore, in the present embodiment, the long side 10c of the operation panel 10 which is likely to be bent and the support panel 30 adhere to each other by the adhesive portion 40, thereby making it possible to suppress the bending, and to effectively generate high frequency vibration and low frequency vibration on the operation panel 10.

As shown in FIG. 4, the intermediate members 41 are provided at positions corresponding to the short sides 10d of the operation panel 10, respectively. Specifically, the intermediate members 41 are provided, for example, in the vicinities of the short sides 10d of the operation panel 10, respectively.

Since the adhesive portion 40 described above is not provided on the short side 10d of the operation panel 10, when the user strongly presses the operation surface 11, the short side 10d is more likely to be bent than the long side 10c. In the present embodiment, since the intermediate members 41 are provided at the positions corresponding to the short sides 10d of the operation panel 10, even if the short sides 10d are bent, the operation panel 10 comes into contact with the intermediate members 41, which makes it possible to suppress deterioration of vibration characteristics of the operation panel 10.

A plurality of the intermediate members 41 are present (here, two), and the plurality of intermediate members 41 are provided to face each other outside the region of the operation surface 11. In this way, even when some portion of the operation surface 11 is strongly pressed by the user, the operation panel 10 can be brought into contact with one or both of the two facing intermediate members 41, which makes it possible to effectively suppress deterioration of vibration characteristics in the operation panel 10.

Here, when the operation panel 10 is vibrated at a high frequency in the ultrasonic band by the vibrators 20, the standing wave W is generated on the operation panel 10 as described above (see FIG. 5). The position of a node part W1 in the standing wave W is, for example, near the end portion of the operation panel 10.

Accordingly, the intermediate member 41 may be provided at position corresponding to the node part W1 of the standing wave W. Specifically, when seen from the operation surface 11 (that is, when seen from the negative direction of the Z axis direction), the intermediate member 41 may include an abdominal part W2 and the node part W1 of the standing wave W generated from the vibrators 20 on the operation panel 10 and may be provided at the position overlapping with the mounting regions of the vibrators 20. The above-mentioned mounting region is the same as the region surrounded by the outline of the vibrators 20 in FIG. 4.

In this way, for example, even when the operation surface 11 is strongly pressed by the user and the operation panel 10 is brought into contact with the intermediate member 41, the vicinity of the node part W1 of the standing wave W comes into contact with the intermediate member 41. Since the node part W1 of the standing wave W is in a position where the amplitude is zero (or substantially zero) and vibration thereof is not generated, the vibration generated on the operation panel 10 is less likely to be weakened even when it comes into contact with the intermediate member 41, and so deterioration of vibration characteristics in the operation panel 10 can be effectively suppressed.

As described above, the input device according to the embodiment includes the operation panel 10, the vibrators 20, the support panel 30, and the intermediate member 41. The operation panel 10 has the operation surface 11. The vibrators 20 are mounted on the operation panel 10 and vibrate the operation panel 10. The support panel 30 is disposed to face the back surface 12 of the operation panel 10 opposite to the operation surface 11 through a space A and supports the operation panel 10. The intermediate member 41 is disposed between the operation panel 10 and the support panel 30, and is brought into contact with any one of the operation panel 10 and the support panel 30. In this way, it is possible to suppress deterioration of vibration characteristics in the operation panel 10.

In the electronic device system 200 described above, the inputs system 100 an the display device 60 are separately disposed (see FIG. 2), but it is not limited thereto. That is, the electronic device system 200 may be configured to include a touch panel in which the input system 100 and the display device 60 are integrated as shown in FIG. 6.

Figure 6:
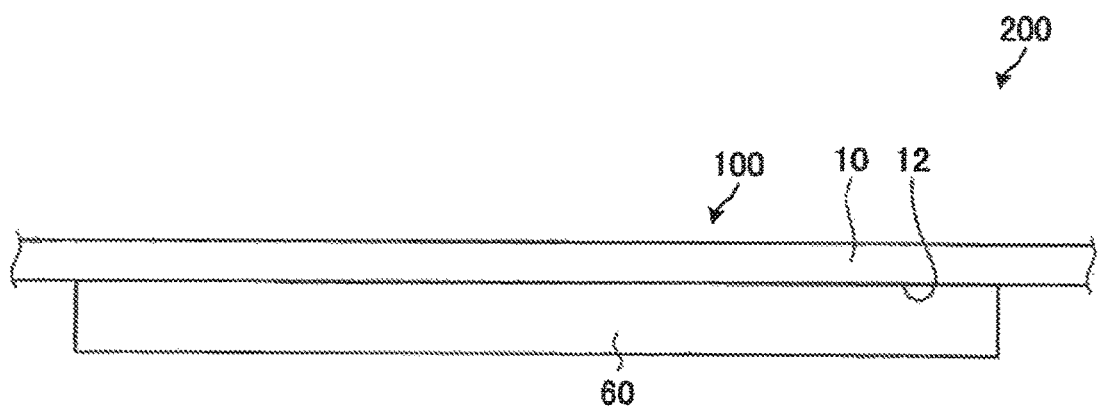
FIG. 6 is a view showing the relationship between the input system and a display device.

FIG. 6 is a view showing the relationship between the input system 100 and the display device 60 in the electronic device system 200. As shown in FIG. 6, the display device 60 is disposed on the back surface 12 of the operation panel 10, and the user can view the screen displayed on the display device 60 through the operation panel 10. In FIG. 6, the support panel 30 and the like is not shown.

5. Modified Example

Figure 7A:
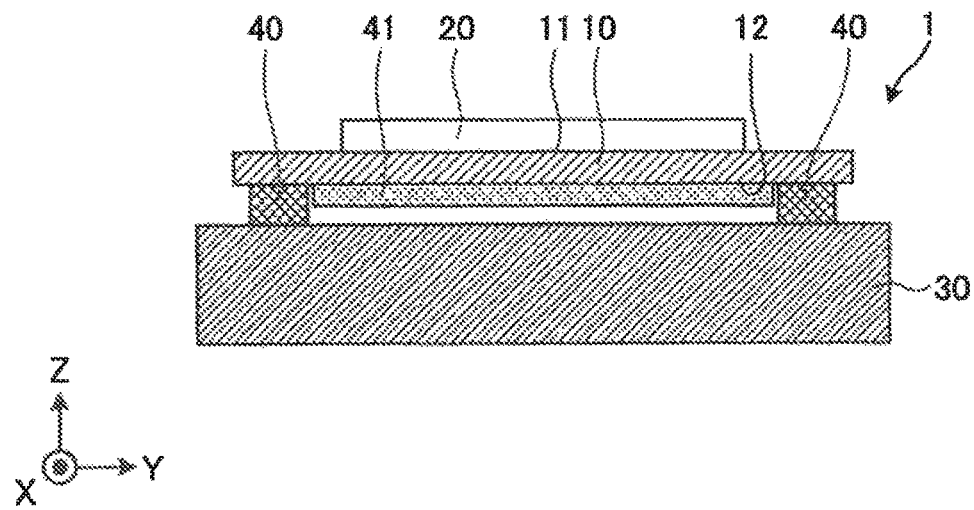
FIG. 7A is a side cross sectional view of an input device according to a modified example.

Next, an input device 1 according to a modified example will be described with reference to FIG. 7A. FIG. 7A is a side cross sectional view of an input device 1 according to the modified example. In FIG. 7A, illustration of a housing 80 and the like is omitted. Further, in the following description, the common constituent elements common to those in the embodiment are denoted as the same reference numerals, and the description thereof will be omitted.

In the embodiment described above, the intermediate members 41 are disposed so as to be brought into contact with the support panel 30, but it is not limited thereto. That is, as in the modified example shown in FIG. 7A, the intermediate members 41 are positioned so as to come into contact with the operation panel 10 and so as not to come into contact with the support panel 30.

Figure 7B:
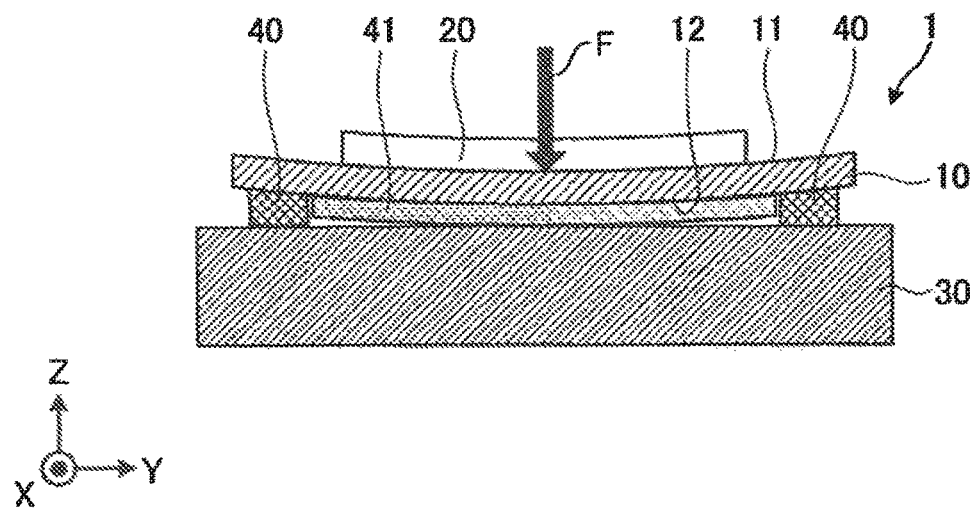
FIG. 7B is the side cross sectional view of the input device according to the modified example.

FIG. 7B is the side cross sectional view of the input device 1 according to the modified example. As indicated by an arrow F in FIG. 7B, even when the operation surface 11 is strongly pressed by the user and the operation panel 10 is bent, the intermediate members 41 and the support panel 30 come into contact with each other without the operation panel 10 and the support panel 30 being brought into contact with each other.

Therefore, for example, vibration generated on the operation panel 10 is less likely to be weakened as compared with the case where the operation panel 10 comes into contact with the support panel 30, which makes it possible to suppress vibration characteristics in the operation panel 10. In this way, the intermediate members 41 may be positioned so as to come into contact with any one of the operation panel 10 and the support panel 30.

In the above description, the vibrator 20 is mounted on the operation surface 11 of the operation panel 10, but it is not limited thereto. For example, the vibrator 20 may be mounted on the back surface 12 which is the opposite side of the operation surface 11 of the operation panel 10.

In the above, the input device 1 includes two intermediate members 41, but is not limited thereto, and the number of intermediate members 41 may be one or three or more.

As the adhesive portion 40, for example, an adhesive tape (double-sided tape) can be used. The adhesive portion 40 is not limited to the adhesive tape, and may be an adhesive or the like.

In the above description, an example in which the electronic device system 200 is mounted on a vehicle is represented, butt is not limited thereto. For example, the electronic device system 200 may be mounted on other types of devices such as a smartphone terminal or a tablet terminal.

Further effects and modified examples can be easily derived by those skilled in the art. Thus, broader aspects of the present invention are not limited to the specific details and the representative embodiment shown and described above. Accordingly, various modifications can be made without departing from the scope and spirit of the general inventive concept as defined by appended claims and equivalents thereof.

What is claimed is:

1. An input device comprising:
   an operation panel that has an operation surface and a back surface facing in a direction opposite to a direction in which the operation surface faces;
   a vibrator that is mounted on the operation panel and vibrates the operation panel;
   a support panel that is disposed to face the back surface of the operation panel, and supports the operation panel, a space provided between the support panel and the back surface of the operation panel; and
   an intermediate member that is disposed between the operation panel and the support panel and is mounted to a first one of the back surface of the operation panel and the support panel,
   wherein the operation panel is a rectangular plate, and
   wherein the intermediate member is provided at a position whereby a longitudinal direction of the intermediate member extends along only a short side of the operation panel, and
   wherein there exists a space between the intermediate member and the operation panel when the operation panel is not pressed so that the intermediate member is not in contact with the operation panel when the operation panel is not pressed, or there exists a space between the intermediate member and the support panel when the operation panel is not pressed so that the intermediate member is not in contact with the support panel when the operation panel is not pressed.

2. The input device according to claim 1,
   wherein the intermediate member is provided at a position corresponding to a node of a standing wave of vibration generated by the vibrator.

3. The input device according to claim 1,
   wherein a plurality of the intermediate members are mounted in a region outside the operation surface, adjacent to opposite ends of the operation surface.

4. The input device according to claim 1, wherein
   the input device further comprises a plurality of adhesive portions, each adhesive portion adhering a long side of the operation panel and the support panel to each other.

5. The input device according to claim 1,
   wherein the intermediate member and a second one of the back surface of the operation panel and the support panel on which the intermediate member is not mounted are separated by a gap.

6. The input device according to claim 1,
   wherein a hardness of the intermediate member is lower than a hardness of the support panel.

7. The input device according to claim 1,
   wherein the intermediate member is compressible.

8. The input device according to claim 1,
   wherein the intermediate member and the vibrator are superposed with each other when viewed in a direction orthogonal to the operation surface.

9. An input system comprising:
   an input device that includes an operation panel that has an operation surface and a back surface facing in a direction opposite to a direction in which the operation surface faces, a vibrator that is mounted on the operation panel and vibrates the operation panel, a support panel that is disposed to face the back surface of the operation panel and supports the operation panel, a space provided between the support panel and the back surface of the operation panel, and an intermediate member that is disposed between the operation panel and the support panel and is mounted to a first one of the back surface of the operation panel and the support panel, the operation panel being a rectangular plate, and the intermediate member is provided at a position whereby a longitudinal direction of the intermediate member extends along only a short side of the operation panel; and a vibration controller that controls the vibrator based on an operation on the operation surface, wherein there exists a space between the intermediate member and the operation panel when the operation panel is not pressed so that the intermediate member is not in contact with the operation panel when the operation panel is not pressed, or there exists a space between the intermediate member and the support panel when the operation panel is not pressed so that the intermediate member is not in contact with the support panel when the operation panel is not pressed.

10. The input system according to claim 9, wherein the vibration controller controls the vibrator so as to switch between a first vibration mode in which vibration of a frequency in an ultrasonic band is generated on the operation panel and a second vibration mode in which vibration of a frequency band lower than the ultrasonic band is generated on the operation panel, based on the operation on the operation surface.

11. The input system according to claim 9, wherein the intermediate member is provided at a position corresponding to a node of a standing wave of vibration generated by the vibrator.

12. The input system according to claim 9, wherein a plurality of the intermediate members are mounted in a region outside the operation surface, adjacent to opposite ends of the operation surface.

13. The input system according to claim 9, wherein the input device further comprises a plurality of adhesive portions, each adhesive portion adhering a long side of the operation panel and the support panel to each other.

14. The input system according to claim 9, wherein the intermediate member and a second one of the back surface of the operation panel and the support panel on which the intermediate member is not mounted are separated by a gap.

15. The input system according to claim 9, wherein a hardness of the intermediate member is lower than a hardness of the support panel.

16. The input system according to claim 9, wherein the intermediate member is compressible.

17. The input system according to claim 9, wherein the intermediate member and the vibrator are superposed with each other when viewed in a direction orthogonal to the operation surface.

\* \* \* \* \*